United States Patent Office  3,819,823
Patented June 25, 1974

3,819,823
MOSQUITO COIL CONTAINING A CHRYSANTHEMIC ACID ESTER
Yositosi Okuno, Toyonaka, Japan, assignor to Sumitomo Chemical Company, Limited, Osaka, Japan
Filed Nov. 4, 1970, Ser. No. 86,840
Claims priority, application Japan, Nov. 14, 1969, 44/91,617
Int. Cl. A01n 9/24, 17/04
U.S. Cl. 424—40   3 Claims

ABSTRACT OF THE DISCLOSURE

A novel insecticidal composition in the form of fumigant which comprises, as an active ingredient, dl-2-allyl-3-methyl-cyclopent - 2 - ene - 1 - one-4-yl d-transchrysanthemate consisting of dl-allethrolone and d-trans-chrysanthemic acid, and an inert carrier, which has a rapid knockdown effect and an effect to delay the recovery of injurious insects knocked down, and which is useful for sanitary, agricultural and horticultural purposes.

---

Figure 1:
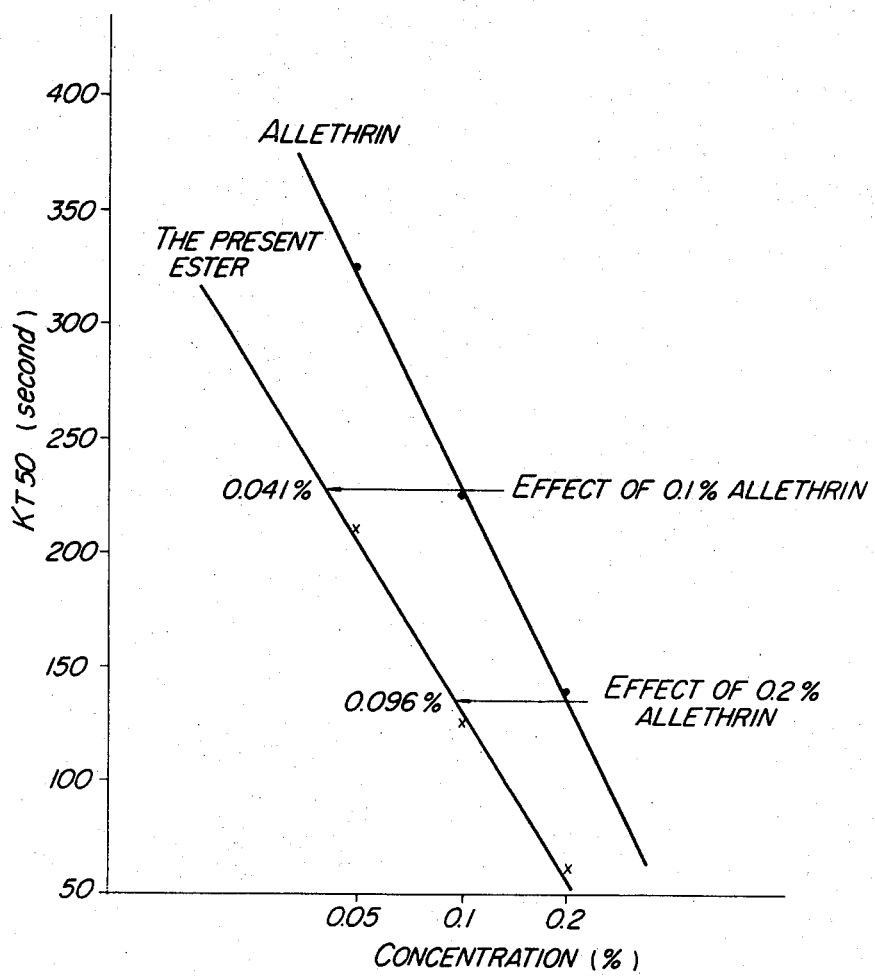

This invention relates to a novel insecticidal composition in the form of fumigant which contains as an active ingredient dl-2-allyl - 3 - methyl-cyclopent-2-ene-1-one-4-yl d-trans-chrysanthemate.

The object of the present invention is to provide a novel insecticidal composition in the form of fumigant which has a rapid knockdown effect and an effect to delay the recovery of injurious insects knocked down, and which is useful for sanitary, agricultural and horticultural purposes.

In the present invention, the effect to delay the recovery of injurious insects knocked down is hereinafter referred to as the persistent effect, and the fumigant means such composition as produce the vapor of the active ingredient by means of heating.

As insecticides for environment sanitation, oil sprays, aerosols, emulsifiable concentrates and dusts of pyrethrin and allethrin have widely been used heretofore because of their low toxicity to mammals and a rapid knockdown effect.

In order to obtain an insecticide having more effective insecticidal activity with low toxicity to mammals, compared with that of the conventional insecticides, the present inventor has extensively studied and attained to the knowledge that an ester consisting of dl-allethrolone and d-trans-chrysanthemic acid (hereinafter referred to as the present ester) can display a specifically high insecticidal activity when used as the fumigant, which is entirely different in application condition from oil sprays, aerosols, etc. Such knowledge cannot easily be inferred theoretically as well as from the knowledge on the insecticidal activity of said ester in the form of an oil spray or the like.

The inventor has found that when used the present ester in the form of a mosquito coil, which is necessarily subjected to heating, the present ester has several times the knockdown effect of the ordinary allethrin product, which is an ester consisting of dl-allethrolone and dl-cis,trans-chrysanthemic acid, and found that even when used in a practical state such as a dilute fumigant, the ester can maintain its insecticidal activity for such a long period of time as cannot be anticipated from a conventional mosquito coil of this kind.

Thus, the present invention is to provide an insecticidal composition in the form of the fumigant containing as an active ingredient an effective amount of dl-2-allyl-3-methyl-cyclopent - 2 - ene-1-one-4-yl d-trans-chrysanthemate obtained by the reaction of dl-allethrolone and d-trans-chrysanthemic acid, and an inert carrier. The effective amount is within a range of 0.05 to 90% by weight.

Various examinations have been made with respect to the relation between the allethrin isomers and the insecticidal activity, and it is well known that commercially available allethrins are mixtures of 8 isomers and, among these, an ester comprising d-allethrolone and d-trans-chrysanthemic acid displays the highest insecticidal activity which has 3.86 times the insecticidal activity of the allethrin product, when used in the form of an oil spray [W. A. Gersdorff and Narman Mitilin: J. Econ. Entmol., 46, page 999 (1953)].

As to the preparation of d-allethrolone, however, there is no hope at all for the industrialization thereof at present, and it is also well known that in order to obtain an allethrin which is higher in insecticidal activity than that of the allethrin product available at present, there may be prepared an ester consisting of dl-allethrolone and d-trans-chrystanthemic acid. For example, Ryo Yamamoto: "Noyakugaku (Agricultural Chemicals)" (published by Nanko-do on Mar. 15, 1963) describes on page 73 that the insecticidal activity on houseflies of the present ester is about 2 times the activity of the ester consisting of dl-allethrolone and dl-cis,trans-chrysanthemic acid, and recommends to use the ester of d-trans-chrysanthemic acid in order to enhance the insecticidal activity of the allethrin product.

The present inventor also tested the insecticidical activity of the individual chemicals on housefly adults and those of oil sprays thereof on housefly adults and Northern house mosquito adults to obtain the results that the insecticidal activity of the present ester is about 2.1 to 2.4 times the activity of allethrin, which well coincided with the results stated by Ryo Yamamoto.

Until today, however, the ester using d-trans-chrysanthemic acid has not been put into practical use. This is ascribable to the fact that when used in the form of an oil spray, the ester of d-trans-chrysanthemic acid, which has not more than about 2 times the insecticidal activity of the ordinary allethrin product, is too low in the insecticidal activity, in view of the production cost thereof, to be practically used in place of the allethrin product which is commercially available at present.

The surprising is finding that when used in the form of fumigant such as a mosquito coil, the present ester gives an insecticide having more rapid knockdown and more persistent effects which are most important for the control of injurious insects, and which cannot be anticipated from the field of conventional studies on allethrin isomers. The present inventor has completed the present invention on the basis of such confirmation that when formulated into the fumigant, the present ester gives an insecticidal composition having such rapid knockdown effect as about 4.2 to 5.6 times the effect of the ordinary allethrin product and having the prominent persistent effect for a long period of time, and that the present insecticidal composition is more advantageous in cost and more excellent in effects than that of the ordinary allethrin product.

The present ester, dl-2-allyl-3-methyl-cyclopent-2-ene-1-one-4-yl d-trans-chrysanthemate ($N_D^{28}$ 1.5029) having the formula,

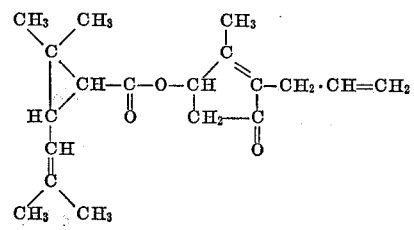

can be obtained easily in high yield by reacting, in the presence of such a dehydrochlorinating agent as pyridine, dl-allethrolone represented by the structural formula (I),

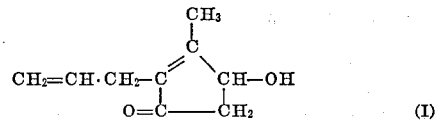

(I)

with a d-trans-chrysanthemic acid halide represented by the general formula (II),

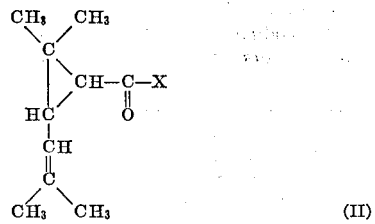

(II)

wherein X is a halogen atom.

The present insecticidal compositions which contain the present ester as an active ingredient are not only usable as domestic insecticides for the control of such sanitary injurious insects as houseflies, mosquitoes, etc. and other injurious insects in the houses, but also widely applicable to greenhouses, vinylhouses and storehouses to control stored cereal-injurious insects and agricultural and horticultural injurious insects.

Figure 2:
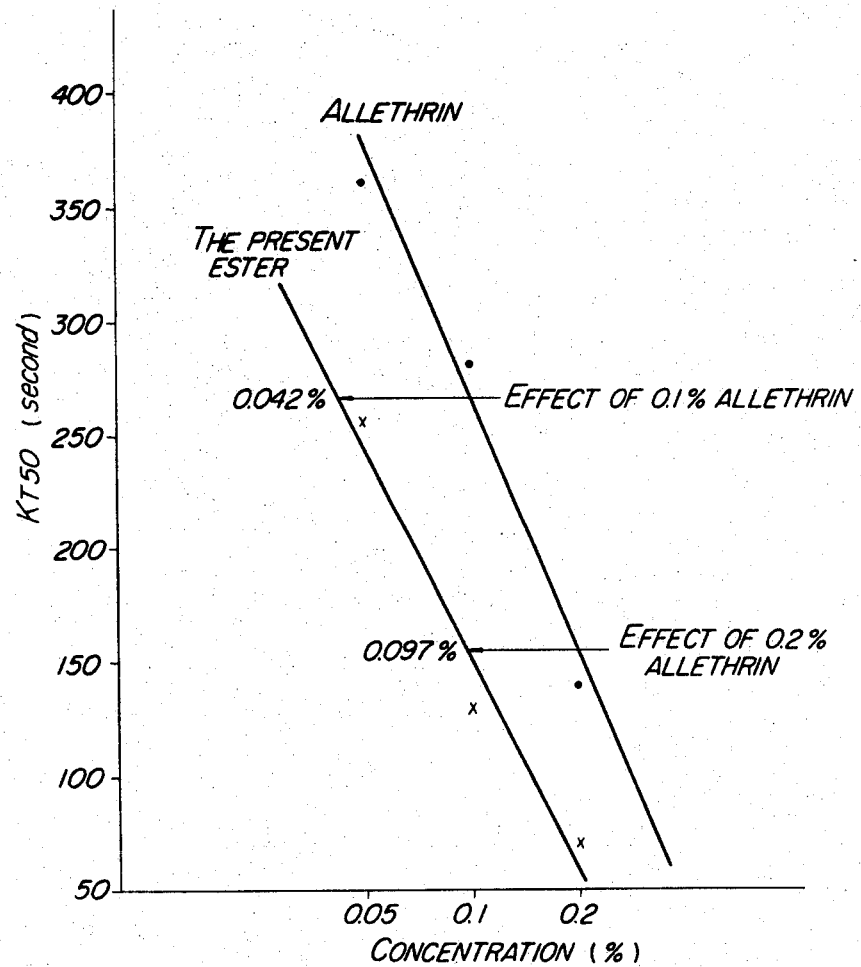
Figure 3:
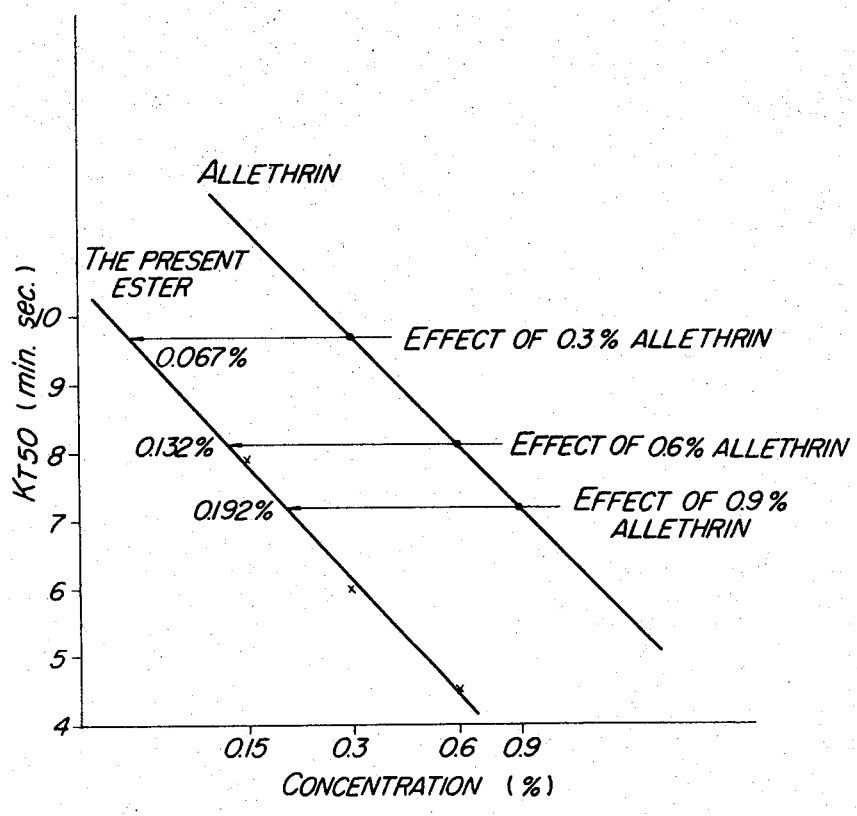
Figure 4:
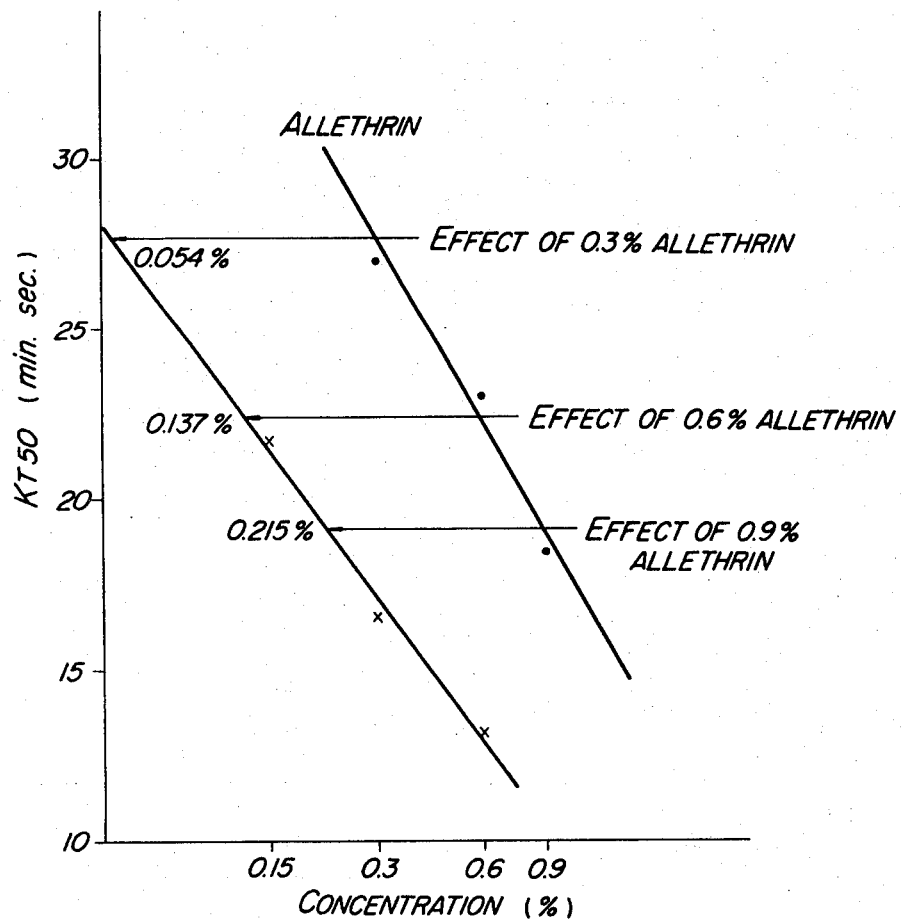
Figure 5:
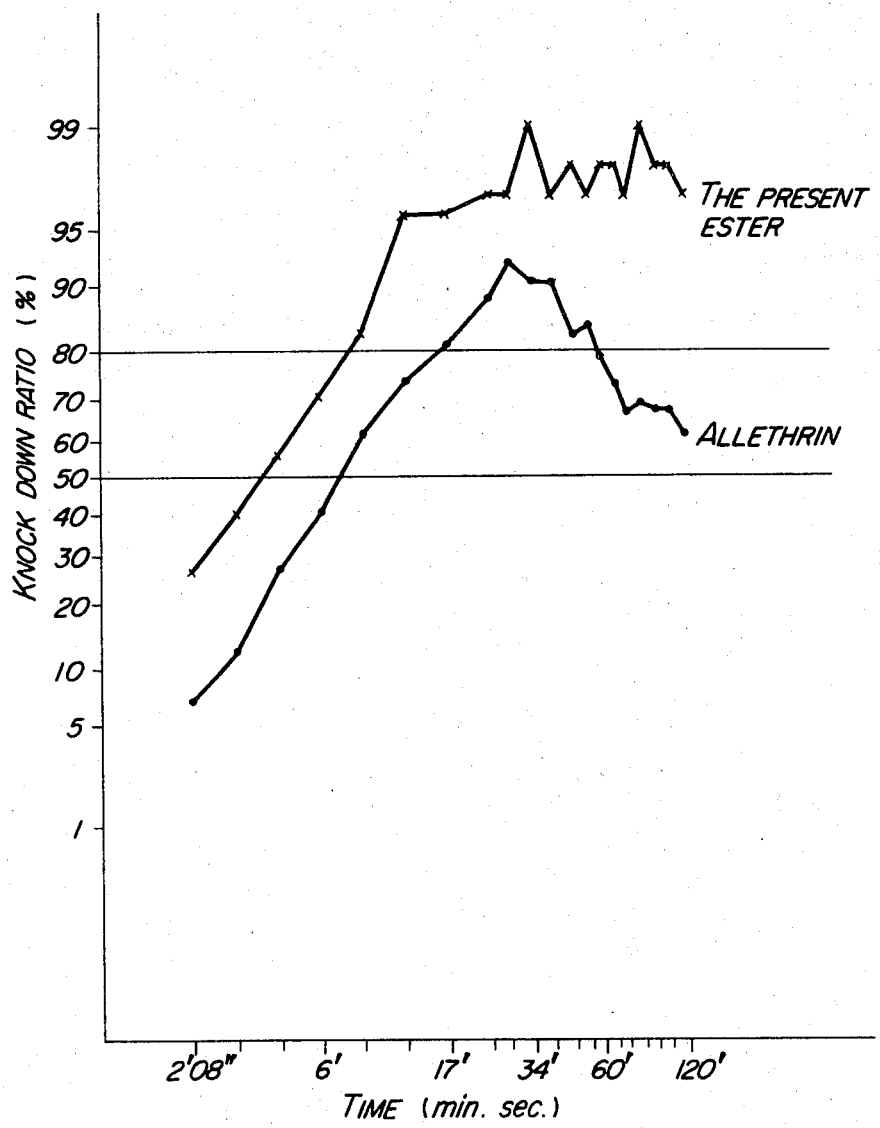

In the accompanying drawings, FIG. 1 shows the relation between a concentration and $KT_{50}$ in the knockdown effect of the oil sprays on Northern house mosquito adults; FIG. 2 shows the relation between a concentration and $KT_{50}$ in the knockdown effects of the oil sprays on housefly adults; FIG. 3 shows the relation between a concentration and $KT_{50}$ in the knockdown effects of the mosquito coils on Northern house mosquito adults; FIG. 4 shows the relation between a concentration and $KT_{50}$ in the knockdown effects of the mosquito coils on housefly adults; and FIG. 5 shows the relation between a time and knockdown ratio in the knockdown effects of the mosquito coils on Northern house mosquito adults.

In order to clarify the fact that the present invention cannot be anticipated from the conventional examinations on insecticidal activity of allethrin isomers, experimental examples and results thereof are set forth below.

EXPERIMENTAL EXAMPLE 1

Allethrin (an ester consisting of dl-allethrolone and dl-cis,trans-chrysanthemic acid) and the present ester were individually adjusted by means of acetone to a test concentration, and tested in insecticidal effects according to a process in which the acetone solution was applied at the dorsum of prothorax of the adult fly using a special microsyringe. As the result, the 50% lethal doses ($LD_{50}$) of the individual test solutions were as shown in Table 1.

TABLE 1

| Test compound | $LD_{50}$ ($\gamma$/fly) | Relative effect (at $LD_{50}$) |
|---|---|---|
| Allethrin | 0.85 | 1.0 |
| Present ester | 0.355 | 2.4 |

EXPERIMENTAL EXAMPLE 2

Allethrin (same as in Experimental Example 1) and the present ester were individually dissolved in deodorized kerosene in given concentrations, and 0.7 ml. of each of the resulting solutions was sprayed by means of an atomizer into a (70 cm.)$^3$ glass chamber. Into the glass chamber had previously been liberated 20 adults per group of Northern house mosquitoes which had elapsed 2 to 3 days after emergence or of houseflies which had elapsed 3 to 5 days after emergence. After the spraying, the knockdown state of the insects was observed at intervals of definite period of time. As the result, the 50% knockdown times ($KT_{50}$) were as shown in Tables 2 and 3.

TABLE 2.—EFFECTS ON NORTHERN HOUSE MOSQUITO ADULTS

| | | | Relative effect in terms of comparison* in concentration | | | |
|---|---|---|---|---|---|---|
| | | | Concentration corresponding to 0.1% allethrin | | Concentration corresponding to 0.2% allethrin | |
| Test compound | Concentration, percent | $KT_{50}$ (sec.) | Concentration, percent | Relative effect | Concentration, percent | Relative effect |
| Allethrin | 0.05 | 325 | | | | |
| | 0.1 | 225 | 0.1 | 1.0 | 0.2 | 1.0 |
| | 0.2 | 138 | | | | |
| Present ester | 0.05 | 210 | | | | |
| | 0.1 | 125 | 0.041 | 2.4 | 0.096 | 2.1 |
| | 0.2 | 62 | | | | |

*Refer to Fig. 1.

TABLE 3.—EFFECTS ON HOUSEFLY ADULTS

| | | | Relative effect in terms of comparison* in concentration | | | |
|---|---|---|---|---|---|---|
| | | | Concentration corresponding to 0.1% allethrin | | Concentration corresponding to 0.2% allethrin | |
| Test compound | Concentration, percent | $KT_{50}$ (sec.) | Concentration, percent | Relative effect | Concentration, percent | Relative effect |
| Allethrin | 0.05 | 360 | | | | |
| | 0.1 | 282 | 0.1 | 1.0 | 0.2 | 1.0 |
| | 0.2 | 140 | | | | |
| Present ester | 0.05 | 225 | | | | |
| | 0.1 | 130 | 0.042 | 2.4 | 0.097 | 2.1 |
| | 0.2 | 72 | | | | |

*Refer to Fig. 2.

The results shown in the above Experimental Examples 1 and 2 well coincide with the results of examination of conventional allethrin isomers, and the insecticidal effect ratio of the present ester, either as it is or in the form of oil spray, to allethrin is not more than about 2.1 to 2.4.

In the next place, the effects of the present ester as heating fumigants are shown below with reference to Experimental Examples 3 and 4.

EXPERIMENTAL EXAMPLE 3

Mosquito coils containing individually 0.3%, 0.6% and 0.9% of allethrin (same as in Experimental Example 1) and those containing individually 0.15%, 0.3% and 0.6% of the present ester were prepared.

Into a (70 cm.)³ glass chamber were liberated each of 20 adults per group of Northern house mosquitoes and 20 adults per group of houseflies. In the case of the Northern house mosquitoes, 1 g. of each of the mosquito coils, and in the case of the houseflies, 2 g. of each of the mosquito coils, were individually ignited on both ends and placed at the center of the chamber. Thereafter, the number of knocked down insects was counted to calculate 50% knockdown times ($KT_{50}$). The results obtained were as shown in Tables 4 and 5.

ester as an active ingredient into a mosquito coil carrier, such as Tabu powder, marc, wood powder, starch and coconut shell powder. Alternatively, the present ester is incorporated in an amount of 0.05 to 90% by weight into a fiber or the like substrata, and then the resulting fumigant is placed on a hot plate heated by means of electric power or the like to a temperature of 120° to 400° C., whereby the active ingredient diffuses with lapse of time to display a fumigant effect for a long period of time. Still alternatively, the present ester is formulated into an oil spray of 0.05

TABLE 4.—EFFECTS ON NORTHERN HOUSE MOSQUITO ADULTS

| Test compound | Concentration, percent | $KT_{50}$ (min. sec.) | Concentration corresponding to 0.3% allethrin | | Concentration corresponding to 0.6% allethrin | | Concentration corresponding to 0.9% allethrin | |
|---|---|---|---|---|---|---|---|---|
| | | | Concentration, percent | Relative effect | Concentration, percent | Relative effect | Concentration, percent | Relative effect |
| Allethrin | 0.3<br>0.6<br>0.9 | 9'42"<br>8'06"<br>7'12" | 0.3 | 1.0 | 0.6 | 1.0 | 0.9 | 1.0 |
| Present ester | 0.15<br>0.3<br>0.6 | 7'54"<br>6'<br>4'30" | 0.067 | 4.5 | 0.132 | 4.5 | 0.192 | 4.7 |

*Refer to FIG. 3.

TABLE 5.—EFFECTS ON HOUSEFLY ADULTS

| Test compound | Concentration, percent | $KT_{50}$ (min. sec.) | Concentration corresponding to 0.3% allethrin | | Concentration corresponding to 0.6% allethrin | | Concentration corresponding to 0.9% allethrin | |
|---|---|---|---|---|---|---|---|---|
| | | | Concentration, percent | Relative effect | Concentration, percent | Relative effect | Concentration, percent | Relative effect |
| Allethrin | 0.3<br>0.6<br>0.9 | 27'<br>23'<br>18'30" | 0.3 | 1.0 | 0.6 | 1.0 | 0.9 | 1.0 |
| Present ester | 0.15<br>0.3<br>0.6 | 21'42"<br>16'36"<br>13'06" | 0.054 | 5.6 | 0.137 | 4.4 | 0.215 | 4.2 |

*Refer to FIG. 4.

EXPERIMENTAL EXAMPLE 4

Mosquito coils containing individually 0.3% of allethrin (same as in Experimental Example 1) and 0.3% of the present ester were prepared.

Into a (70 cm.)³ glass chamber were liberated 20 adults per group of Northern house mosquitoes, and a battery-driven small electric fan of 13 cm. in blade diameter was rotated in the chamber. Thereafter, each of the mosquito coils of about 3 cm. in length was ignited on one end, burned for 2 minutes in the glass chamber and then removed. After ignition of the mosquito coil, the number of knocked-down insects was counted with lapse of time for 120 minutes to calculate the knockdown ratio of the insects. The results obtained were as shown in Table 6.

to 90% by weight concentration, and the oil spray is ascended by capillary action through a lamp-wick or the like and then heated, whereby a fumigant effect can be displayed as well.

The present ester, which is an active ingredient of the present compositions, may not only be used singly but may be incorporated with, as stabilizers, suitable amounts of phenol or bisphenol derivatives such as BHT or the like, or arylamines such as phenyl-α-naphthylamine, phenyl-β-naphthylamine or condensation product of phenetidine with acetone, whereby compositions which have been more stabilized in insecticidal effects can be obtained. Further, the compositions may be increased in insecticidal activity by incorporation of synergists for pyrethroid

TABLE 6

| Test Compound | Combustion amt., mg./min. | Knock-down ratio with lapse of time, percent | | | | | | | | | | | | | | | | | | | $KT_{50}$* |
|---|---|---|---|---|---|---|---|---|---|---|---|---|---|---|---|---|---|---|---|---|---|
| | | 2'08" | 3' | 4'15" | 6' | 8'30" | 12' | 17' | 24' | 28' | 34' | 40' | 48' | 54' | 60' | 68' | 74' | 84' | 94' | 105' | 120' | |
| Allethrin | 90 | 6.9 | 12.7 | 27.5 | 40.2 | 61.8 | 73.5 | 80.4 | 88.2 | 92.2 | 90.2 | 90.2 | 82.4 | 84.3 | 78.4 | 72.5 | 66.7 | 68.6 | 63.7 | 63.7 | 61.8 | 7'06" |
| Present ester | 84 | 27.6 | 40.1 | 56.1 | 70.4 | 82.7 | 95.9 | 95.9 | 96.9 | 96.9 | 99.0 | 96.9 | 98.0 | 96.9 | 98.0 | 98.0 | 96.9 | 99.0 | 98.0 | 98.0 | 96.9 | 3'42" |

*Refer to Fig. 5.

As is clear from the above Experimental Example 5, the present ester is shorter in 50% knockdown time ($KT_{50}$), and thus is more rapid in knockdown effect, than allethrin. Further, allethrin show a knockdown effect of more than 80% for about 40 minutes from 17 to 60 minutes after ignition, whereas the present ester can maintain a knockdown effect of more than 95% during a period from 8 to 120 minutes after ignition, i.e. over such a long period of time as more than about 110 minutes.

The present ester can be formulated according to the conventional procedure into a markedly effective mosquito coil by incorporating 0.05 to 5% by weight of the present type insecticides such as α-[2-(2-butoxyethoxy)ethoxy]-4,5-methylenedioxy-2-propyltoluene (hereinafter referred to as "piperonyl butoxide"), N-(2-ethylhexyl)-bicyclo(2,2,1)hepta - 5 - ene-anhydrophthalic acid-2,3-dicarboximide (hereinafter referred to as "MGK-264") and the like.

Procedures for the preparation of the present compositions and effects thereof are illustrated below with reference to examples and test examples, but it is needless to say that the scope of the present invention is not limited to the examples.

EXAMPLE 1

A solution of 0.3 g. of the present ester in 5 ml. of methanol is throughly mixed with a mixture comprising 60 g. of pyrethrum marc, 30 g. of Tabu powder and 9.7 g. of wood powder. The resulting mixture is kneaded with about 100 ml. of water, and then shaped and dried to prepare 100 g. of a mosquito coil.

If necessary, the product may be colored by addition of 0.5% of Malachite Green or the like dye, or may be incorporated with phenol or para-hydroxybenzoate.

EXAMPLE 2

A solution of 0.2 g. of the present ester in chloroform is uniformly adsorbed on the surface of an asbestos piece of 2.5 cm. x 1.5 cm. in area and 0.3 cm. in thickness. Onto the thus treated asbestos piece is adhered another asbestos piece same in size to obtain an insecticidal fumigant composition for use on an electrically heated plate.

As the fibrous support, there may be used, in addition to asbestos, a pulp plate or the like material equal in effect to asbestos.

EXAMPLE 3

A solution of 0.2 g. of the present ester and 0.6 g. of MGK-264 in 5 ml. methanol is added to a mixture comprising 60 g. of pyrethrum marc, 30 g. of Tabu powder, 9.2 g. of wood powder, and the resulting mixture is treated in the same manner as in Example 1 to obtain a mosquito coil.

Insecticidal effects of the present compositions obtained in the above manner are shown below with reference to test examples.

TEST EXAMPLE 1

In a (70 cm.)$^3$ glass chamber were liberated about 50 adults of Northern house mosquitoes, and 0.2 g. of each of the mosquito coils obtained according to Examples 1 and 3 was ignited on both ends and placed at the center of the bottom of the chamber. Subsequently, the smoke inside the chamber was stirred by means of a small electric fan of 13 cm. in blade diameter, whereby each of the mosquito coils could knock down within 15 minutes more than 90% of the mosquito adults.

TEST EXAMPLE 2

Into a (70 cm.)$^3$ glass chamber were liberated about 50 adults of houseflies. The insecticidal fumigant composition obtained according to Example 2 was placed on an electric heating means and placed at the center of the bottom of the chamber, and an electric current was applied to said electric heating means. Subsequently, the interior of the chamber was stirred by means of a small electric fan of 13 cm. in blade diameter, whereby more than 90% of the housefly adults could be knocked down within 20 minutes.

What I claim is:

1. A mosquito coil consisting essentially of an insecticidally effective amount of from 0.05 to 90% by weight of dl-2-allyl-3-methyl-cyclopent-2-ene-1-one-4-yl d-trans-chrysanthemate and an inert carrier.

2. The mosquito coil of claim 1 wherein the effective amount is from 0.05 to 5% by weight.

3. A method for killing insects, which comprises exposing insects to a vapor produced by heating the mosquito coil of claim 1.

References Cited

UNITED STATES PATENTS

| | | | |
|---|---|---|---|
| 3,266,984 | 8/1966 | Ueda et al. | 424—306 X |
| 2,607,796 | 8/1952 | Schechter et al. | 424—306 X |

OTHER REFERENCES

Yamamoto: "Noyakugaku (Agricultural Chem.), pub. by Manko-do, p. 73 (1963).

Gersdorff et al.: J. Econ. Entom. 46, 999-1003 (1953).

ALBERT T. MEYERS, Primary Examiner

L. SCHENKMAN, Assistant Examiner

U.S. Cl. X.R.

424—306